United States Patent Office 3,148,207
Patented Sept. 8, 1964

3,148,207
PROCESS FOR PREPARING ALKYL ESTERS
Oliver J. Weinkauff, St. Louis, and Robert H. Mills, Webster Groves, Mo., assignors to Monsanto Company, St. Louis, Mo., a corporation of Delaware
No Drawing. Filed Apr. 14, 1958, Ser. No. 728,053
31 Claims. (Cl. 260—475)

This invention relates to a new process for preparing esters and, more particularly, to a new method for preparing alkyl esters of organic carboxylic acids utilizing an alkyl halide, organic carboxylic acid and a tertiary amine.

Esters of carboxylic acids, particularly esters of arylene and alkylene polycarboxylic acids, have been widely used as synthetic lubricants and as plasticizers for synthetic resins, and principally as plasticizers for polyvinyl chloride. In general, such esters have been prepared by esterifying a carboxylic acid with an alcohol in the presence of an esterification catalyst, preferably an acid esterification catalyst, employing an excess of alcohol to function as an entraining agent in removing water formed in the reaction. Although this method suffices in many situations, in the case of esterifying monohydroxy alcohols with carboxylic acids for use as ester plasticizers, different methods have been constantly sought due to the high cost of the monohydroxy alcohols which are normally used to prepare ester plasticizers for halogen-containing resins. In the case of secondary monohydroxy alcohols, their use has been limited due to low yields because of the susceptibility of secondary alcohols to olefin formation. It has been proposed to prepare epoxy-substituted esters by reacting a chloro- or bromo-substituted epoxy compound with the desired organic carboxylic acid in the presence of a catalytic quantity of quaternary salts or tertiary amines. By this method, however, at least twice the stoichiometric quantity of epoxy compound must be used, and usually from 4 to 8 equivalents are preferred. Use of such a large quantity of the epoxy compound makes such a method very expensive and therefore of minimal practicable use. In order to properly conduct such a reaction, a solvent is needed or, depending upon the reactants, a large excess of the epoxy compound serves as the solvent. Obviously, use of a solvent causes problems in separating the product, large volume reactors, etc. Other similar methods have been shown, such as the preparation of phenacyl benzoate from phenacyl bromide and benzoic acid in the presence of triethylamine. Here again, however, a solvent, such as acetone, was found to be necessary. Thus, in these prior methods, it is necessary to employ a solvent and an activated halide. An activated halide is one which contains either a strong electron-donating group adjacent to the halogen-containing carbon or one that contains an unsaturated grouping in such a position that a carbonium ion formed by loss of a halide ion is stabilized by resonance. If either of the above types of structures is present, the result is an increase in the ease of formation of the carbonium ion; that is, such a structure shows a marked labilizing effect when attached to the carbon holding the halogen. Conversely, an unactivated halide is one which does not contain either of these conformations. A practical consideration of the above is that alkyl halides, being unactivated halides, have not been successfully used in esterification reactions. Studies of the relative rates of reaction of "activated" and "unactivated" halides have been made, examples of the results of which can be found in Gilman Organic Chemistry (vol. I ) (2nd ed., 1943), page 1054. Thus, it is therein shown, for example, that on the basis of n-butyl chloride (an alkyl halide) having a reaction rate of 1, the relative reaction rates of various activated halides are as follows:

Allyl chloride _____ 79
Benzyl chloride _____ 195
Benzoyl chloride _____ 700
Phenacyl chloride _____ 105,000
Acetonyl chloride _____ 35,700

On the other hand, other alkyl halides have reaction rates, relative to n-butyl chloride as 1, as follows:

Ethyl chloride _____ 1.94
n-Propyl chloride _____ 1.03
n-Hexyl chloride _____ 1.22
n-Octyl chloride _____ 1.32
n-Dodecyl chloride _____ 1.00
n-Hexadecyl chloride _____ 0.90
Isopropyl chloride _____ 0.015
Isobutyl chloride _____ 0.018
2-chloro-n-octane _____ 0.026
2-chloro-n-pentane _____ 0.048

From the above, it is therefore obvious that alkyl halides are unactivated halides. However, the method of this invention has made a significant advance in the art, enabling the use of alkyl halides which were previously unusable due to their inherent unreactivity.

It has now been found that alkyl esters of organic carboxylic acids can be prepared by a practical and commericially feasible method. Essentially, the method of this invention involves heating and alkyl halide, an organic carboxylic acid and a tertiary amine. More specifically, the method of this invention involves heating, in substantially equimolar amounts, an alkyl halide, an organic carboxylic acid and a tertiary amine. In order to obtain maximum yields of alkyl esters of organic carboxylic acids by this method of our invention, it is necessary to conduct the reaction in the absence of water. Although the presence of some water will not render the reaction inoperative, it will cause a reduction in the maximum obtainable yield of ester.

We have made a further surprising discovery that organic carboxylic acid anhydrides can be heated with an equimolar amount of water, an alkyl halide and a tertiary amine to produce alkyl esters of organic carboxylic acids without any decrease in yield as compared to the yield obtainable by reacting the free carboxylic acid, alkyl halide and tertiary amine in the absence of water.

We have also found that, contrary to the teaching of the prior art, although a solvent may be employed, it is preferred to conduct the reaction without a solvent in order to obtain the maximum yield of desired ester. Thus, for example, it is preferred to use a halo-alkane free from unhalogenated alkane, but when commercial quantities of halo-alkane are utilized, it is not always possible to obtain a completely monohalogenated alkane. In such a situation, unhalogenated alkane is considered a diluent which does not prohibit utilization of the method of this invention.

The alkyl halide reactant of this invention can be represented by RX, where R is a straight or branched chain alkyl radical containing up to 20 carbon atoms and X is a halogen atom, such as chlorine, bromine and iodine atoms, with a preference in that order. It is preferred that RX be an alkyl halide containing 4 to 20 carbon atoms.

As illustrative of the preferred alkyl halide reactants of this invention are n-butyl chloride, n-butyl bromide, sec.-butyl chloride, n-amyl chloride, isoamyl chloride, sec.-amyl chloride, sec.-amyl iodide, n-amyl bromide, n-hexyl chloride, isohexyl chloride, sec.-hexyl chloride, 2-chlorohexane, n-heptyl chloride, isoheptyl chloride, 2-chloroheptane, n-octyl chloride, n-octyl bromide, n-octyl iodide, isooctyl chloride, 2-chlorooctane, 4-chlorooctane, 2-ethylhexyl chloride, 2-chlorononane, 3-chlorononane, 2-chlorodecane, n-decyl chloride, 3-chlorodecane, undecyl chloride, 2-chloroundecane, n-dodecyl chloride, n-dodecyl bromide, 2-chlorododecane, 2-bromododecane, 3-chlorododecane, tridecyl chloride, tetradecyl chloride, pentadecyl chloride, hexadecyl chloride, octadecyl chloride, octadecyl bromide, eicosyl chloride, and the various isomers thereof and various mixtures thereof, as, for example, those obtained upon mono-chlorinating alkane fractions obtained from petroleum. Particularly suitable alkanes are those obtained from petroleum fractions boiling at atmospheric pressure in the range of about 30° C. to about 300° C., such as a pentane cut from 30° C. to about 40° C., a gasoline boiling from about 90° C. to about 120° C., a ligroin boiling from about 90° C. to about 120° C., a benzine boiling from about 120° C. to about 150° C., and a kerosene boiling from about 150° C. to about 235° C.

The organic carboxylic acid reactant of this invention can be any organic carboxylic acid. Non-limiting examples of such acids are acetic acid, propionic acid, butyric acid, caproic acid, caprylic acid, capric acid, lauric acid, tridecanoic acid, myristic acid, oleic acid, palmitic acid, stearic acid, acrylic acid, methacrylic acid, crotonic acid, iso-crotonic acid, 3-butanoic acid, sorbic acid, malonic acid, succinic acid, adipic acid, pimelic acid, sebacic acid, dodecanedoic acid, maleic acid, fumaric acid, benzoic acid, naphthoic acid, phthalic acid, isophthalic acid, terephthalic acid, naphthalic acid, pyromellitic acid, salicylic acid and the toluic acids.

Tertiary amines suitable for use in the process of this invention can be represented by the structure,

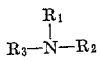

wherein $R_1$, $R_2$ and $R_3$ are like or unlike aliphatic radicals. Preferably, $R_1$, $R_2$ and $R_3$ have a total of 3 to 24 carbon atoms, and it is also preferred that $R_1$, $R_2$ and $R_3$ be alkyl radicals. Non-limiting examples of such tertiary amines are trimethylamine, triethylamine, tri-n-propylamine, triisopropylamine, tri-n-butylamine, triisoamylamine, trihexylamine, triethanolamine, methyldiethylamine, dimethylethylamine, methyldiethanolamine, dimethylethanolamine, dimethylcyclohexylamine, dimethylhexylamine, diethylhexylamine, dimethyldecylamine, and the like.

It is preferred to add the tertiary amine and the alkyl halide simultaneously to the acid. However, the amine and alkyl halide can be mixed and then added to the acid, or added separately and in sequence, or the acid and halide can be added to the amine, etc. The temperatures employed can be about 50° C. to the reflux temperature of the system; however, it has been found that a temperature of 100° C. to 200° C. is usually satisfactory.

The quantities of reactants which are used are dependent upon whether a mono- or a polycarboxylic acid is used, and in the case of polycarboxylic acids, whether mono-ester or polyester is desired. When a monocarboxylic acid is used, the alkyl halide and tertiary amine are used in substantially equimolar proportions based upon the quantity of acid. In the case of polycarboxylic acids, the quantity of alkyl halide and tertiary amine which is used depends upon whether mono- or polyesterification is desired. Thus, for example, if a mono-ester of adipic acid were to be made, about one molecular equivalent of halide and about one molecular equivalent of amine would be employed per molecular equivalent of adipic acid. If it is desired to produce the di-ester, about two molecular equivalents of each amine and halide per molecular equivalent of acid would be employed. Also, mixed esters of carboxylic acids can be made by the process of this invention, either by reacting different alkyl halides simultaneously or in sequence. The various possible ways in which this invention can be used can be more fully understood by reference to the examples included herein.

A particularly significant advantage of the method of this invention, noted above, is that the anhydrides of organic carboxylic acids which form anhydrides, such as phthalic anhydride, maleic anhydride, succinic anhydride, glutaric anhydride, pyromellitic anhydride, etc., can be used directly. In order to use an anhydride in the practice of our invention, equivalent amounts of water and anhydride are used, and the reaction is caused to proceed as when starting with an acid. This is noteworthy since mere addition of an equivalent amount of water to an anhydride produces essentially no acid due to the fact that hydrolysis of anhydrides to acids proceeds at a very slow rate, especially when there are equivalent quantities of anhydride and water present, since the formation of acid from anhydride and water is a second order reaction. Thus, it would be unexpected that anhydride and water could be utilized, as described, to replace acids in the reaction of an alkyl chloride and an organic carboxylic acid. Furthermore, although the presence of water in the reaction utilizing an acid causes a decrease in yield of ester, the use of equivalent amounts of water and anhydride in place of acid does not decrease the yield which is obtainable using acid per se.

It is specifically contemplated that by the method of this invention, various petroleum fractions containing up to 20 carbon atoms can be halogenated with sufficient halogen to give an average of monohalogen and serve as the alkyl halide reactant of this invention. Thus, by the method of this invention, higher alkyl esters can be produced easily and inexpensively, which was not so before. Thus, the petroleum fractions known as cymogen, rhigolene,, petroleum ether, gasolene, naphtha, ligroin, benzine and kerosene, etc., can be halogenated to a point determined, for example, by specific gravity measurements or various chemical methods, equivalent to monohalogenation, and the halogenated product (usually a mixture of alkane and halogenated alkane containing primarily monohalogenated alkane with some polyhalogenated alkane) can then be used as the alkyl halide reactant of this invention. In such a situation, the alkane is merely present as an unreative diluent. The polyhalogenated alkane may react to form polyesters as well as mixtures of mono-esters and mixtures of mixed esters.

Illustrations of the process of this invention are given in the following examples. Parts are parts by weight unless otherwise stated.

*Example 1*

To a suitable reaction vessel equipped with a thermometer, agitator and reflux condenser (the apparatus used throughout) were charged 41.6 parts of terephthalic acid, to which were added, with constant agitation, 54.8 parts of triethylamine and 95.4 parts of 1-chlorodecane as follows:

| Time (Minutes) | Temperature, °C. | Remarks |
|---|---|---|
| 0 | 20 | Triethylamine addition begun. |
| 9 | 93 | 33% of trimethylamine added. |
| 14 | 91 | 35% of trimethylamine added; addition of triethylamine stiopped and addition of 1-chlorodecane begun. |
| 22 | 128 | 41% of 1-chlorodecane added; addition of 1-chlorodecane stopped and addition of triethylamine resumed. |
| 24 | 151 | 41% of triethylamine added; addition of amine stopped. |
| 40 | 155 | Addition of both triethylamine and 1-chlorodecane resumed simultaneously. |
| 51 | 155 | 50% of both triethylamine and 1-chlorodecane added. |
| 155 | 144 | 71% of both triethylamine and 1-chlorodecane added. |
| 235 | 158 | All of both triethylamine and 1-chlorodecane added. |

Upon completion of the addition of triethylamine and 1-chlorodecane, the mass was heated at about 157° C.

for about 8 hours, cooled and mixed with 100 parts of water. Upon separation of two liquid layers, the upper layer was withdrawn and successively washed with water, aqueous sodium hydroxide, and water and dried. The crude dried mass was distilled under vacuum to remove the volatile components. The yield of di-n-decyl terephthalate, based on terephthalic acid used, was 87%.

*Example 2*

To the reaction vessel was charged 41.8 parts of isophthalic acid, to which was added, over about 4¾ hours, with constant agitation and while heating the reaction mass up to about 150° C., 54.8 parts of triethylamine and 95.4 parts of 1-chlorodecane. Upon completion of the addition of triethylamine and 1-chlorodecane, the reaction mass was heated for about 8.5 hours at 150° C., cooled and mixed with approximately 100 parts of water and approximately 6 parts of concentrated hydrochloric acid. The mass separated into two layers. The upper layer was withdrawn and successively washed with water, aqueous sodium hydroxide and water, dried and then subjected to vacuum distillation to remove the volatile components. The yield of di-n-decyl isophthalate, based on isophthalic acid used, was substantially 100%.

*Example 3*

To the reaction vessel was charged approximately 59.4 parts of phthalic anhydride and 7.4 parts of water, to which was added, with constant agitation and while heating, 86 parts of triethylamine and 134 parts of n-octyl chloride as follows:

| Time (Minutes) | Temperature, °C. | Remarks |
|---|---|---|
| 0 | 55 | Triethylamine addition begun. |
| 2 | 105 | 9% of amine added. |
| 5 | 140 | 16% of amine added. |
| 18 | 136 | 41% of amine added; amine addition stopped. |
| 20 | 135 | n-octyl chloride addition begun. |
| 21 | 126 | 13% of chloride added. |
| 25 | 145 | 52% of chloride added; chloride addition stopped. |
| 74 | 155 | Chloride addition resumed. |
| 76 | 137 | 84% of chloride added; chloride addition stopped; amine addition resumed. |
| 82 | 141 | 80% of amine added; amine addition stopped. |
| 105 | 169 | Chloride addition resumed. |
| 108 | 161 | All of chloride added; amine addition resumed |
| 115 | 147 | All of amine added. |

Upon completion of the amine adidtion, the mass was heated at about 155° C. for about 4 hours, cooled and mixed with 100 parts of water and about 2 parts of hydrochloric acid. The mass separated into two liquid layers. The organic layer was withdrawn and washed successively with water, aqueous sodium hydroxide and water, then sparged with steam under vacuum and dried. The yield of di-n-octyl phthalate, based on the phthalic anhydride charged was 97.6%.

*Example 4*

To the reaction vessel was charged 83.4 parts of phthalic acid, to which was added, over about 16¾ hours, with constant agitation and while heating the mass up to a maximum temperature of about 145° C., 106.4 parts of triethylamine and 102.0 parts of n-butyl chloride. Upon completion of the chloride addition, the mass was heated at about 150±10° C. for about five hours, cooled and mixed with about 150 parts of water and about 12 parts of hydrochloric acid. The mass separated into two liquid layers; the organic layer was withdrawn and washed successively with water, aqueous potassium bicarbonate and water, then sparged with steam under vacuum and dried. The yield of di-n-butyl phthalate, based on the phthalic acid charged, was 86.5%.

*Example 5*

To the reaction vessel was charged 50.1 parts of phthalic acid, to which was added, over about 3 hours, with constant agitation and while heating to about 155° C., 118.8 parts of tri-n-butylamine and 116.5 parts of n-decyl chloride. Upon completion of the amine addition, the mass was heated at about 145–154° C. for about four hours, cooled to about 60° C. and mixed with about 185 parts of water and about 12 parts of hydrochloric acid. The mass separated into two liquid layers; the organic layer was withdrawn and washed successively at about 60° C. with water, aqueous potassium bicarbonate and water, then sparged with steam under vacuum and dried. The yield of di-n-decyl phthalate, based on the phthalic acid used, was 94%.

*Example 6*

To the reaction vessel was charged 83.4 parts of phthalic acid, to which was added, with constant agitation and while heating, 106.4 parts of triethylamine, 75.9 parts of n-octyl chloride and 51.0 parts of n-butyl chloride as follows:

| Time (Minutes) | Temperature, °C. | Remarks |
|---|---|---|
| 0 | 20 | Triethylamine addition begun. |
| 4 | 110 | 12.5% of amine added. |
| 8 | 155 | 28% of amine added. |
| 13 | 134 | 48% of amine added; amine addition stopped; octyl chloride addition begun. |
| 19 | 120 | All n-octyl chloride added. |
| 152 | 161 | Remainder of amine admixed with butyl chloride and addition begun. |
| 195 | 141 | 9% of C₄H₂Cl-amine mixture added. |
| 217 | 143 | 28% of C₄H₂Cl-amine mixture added. |
| 267 | 121 | 65% of C₄H₂Cl-amine mixture added. |
| 385 | 121 | 94% of C₄H₂Cl-amine mixture added. |
| 445 | 134 | All of mixture added. |

Upon completion of the addition of the reactants, the mass was heated at 140–150° C. for about five hours, cooled and mixed with about 100 parts of water and about 15 parts of hydrochloric acid. The mass separated into two liquid layers; the organic layer was withdrawn and washed successively with water, aqueous potassium bicarbonate and water, sparged with steam under vacuum and dried. Based on phthalic acid charged, the conversion to diester was 78.6%. Upon fractional distillation of the diester product, it was found to contain 6% di-n-butyl phthalate, 33% di-n-octyl phthalate, and 61% n-butyl n-octyl phthalate.

*Example 7*

To the reaction vessel was added 51.9 parts of phthalic anhydride and 26.3 parts of n-butyl alcohol. After the mass was heated to about 150° C., there was added approximately 74.1 parts of n-decyl chloride with agitation over a period of about 10 minutes, the temperature dropping to about 90° C. Upon completion of the n-decyl chloride addition, substantially 36.5 parts of triethylamine was added over a period of about 3 hours while increasing the temperature to about 150° C. The mass was then heated at about 150° C. with agitation for approximately 3 hours. The viscous mass was cooled to below 100° C. and mixed, with agitation, with 100 parts of water containing about 2 parts of concentrated hydrochloric acid. The liquid mass separated into two layers; the upper layer was removed and washed successively with water, aqueous sodium carbonate and water, then sparged with steam under vacuum and dried. The conversion to n-butyl n-decyl phthalate, based on phthalic anhydride, was 93.2%.

*Example 8*

To the reaction vessel was added approximately 110 parts of n-butyl acid phthalate which was heated to approximately 143° C. To the heated mass was added, over a period of approximately one hour, a mixture of 52.7 parts of triethylamine and 122.9 parts of 1-chlorododecane while maintaining the temperature at about 150° C. Upon completion of the addition of the mixture, the mass was heated at about 150° C. for approximately six hours. The viscous mass was then cooled below 100° C. and mixed with about 100 parts of water and approximately 3 parts of concentrated hydrochloric acid. The liquid mass separated into two layers; the upper layer was withdrawn and successively washed with water, aqueous sodium carbonate and water, sparged with steam under vacuum and dried. The conversion of n-butyl acid phthalate to n-butyl n-dodecyl phthalate was approximately 93.5%.

*Example 9*

To the reaction vessel was charged approximately 59.4 parts of phthalic anhydride, 30.4 parts of n-butyl alcohol, and approximately 100.7 parts of tridecyl chloride (which chloride was that obtained upon reacting thionyl chloride with a mixture of highly branched primary $C_{13}$ alcohols obtained by the oxo reaction on propylene tetramers). The mass was agitated and, while heating at 128–156° C. over a period of about 50 minutes, there was added thereto 42.1 parts of triethylamine. Upon completion of the amine addition, the mass was heated at about 150–156° C. for about 4.5 hours, then cooled and mixed with about 100 parts of water and about 5 parts of hydrochloric acid. The organic layer was removed and washed successively with water, aqueous sodium carbonate and water, then sparged with steam under vacuum and dried. The yield of n-butyl tridecyl phthalate, based on phthalic anhydride charged, was 84.7%.

*Example 10*

To the reaction vessel was charged about 15.1 parts of methyl alcohol, 66.8 parts of phthalic anhydride and 80.4 parts of 1-chlorooctane and the mass heated to about 70° C. Thereafter, while heating the mass to about 185° C., 46.6 parts of triethylamine was added over about one hour. Upon completion of the amine addition, the mass was heated at 180–188° C. for about two hours, cooled and mixed with about 100 parts of water and two parts of hydrochloric acid. The organic layer was removed and washed successively with water, aqueous sodium carbonate and water, then sparged with steam under vacuum and dried. The yield of methyl n-octyl phthalate, based upon phthalic anhydride, was 92.3%.

*Example 11*

To the reaction vessel was charged about 66.8 parts of phthalic anhydride, 33.7 parts of n-butyl alcohol and 80.4 parts of 2-ethylhexyl chloride. The mass was heated to about 150° C. over about 2¾ hours while adding thereto about 46.6 parts of triethylamine. Upon completion of the amine addition, the mass was heated at about 150° C. for about 8 hours, cooled and mixed with about 100 parts of water and 10 parts of hydrochloric acid. The organic layer was withdrawn and washed twice with aqueous sodium carbonate and finally with water. The washed mass was then sparged with steam under vacuum and dried. The yield of n-butyl 2-ethylhexyl phthalate, based on phthalic anhydride used, was 96.5% of theory.

*Example 12*

To the reaction vessel was charged approximately 69 parts of capric acid. Thereafter, with agitation and while heating, about 43 parts of triethylamine and 99 parts of 1-chlorododecane were added as follows:

| Time (Minutes) | Temperature, ° C. | Remarks |
| --- | --- | --- |
| 0 | 33 | Triethylamine addition begun. |
| 2 | 78 | 13% of triethylamine added. |
| 3 | 83 | 23% of triethylamine added. |
| 5 | 92 | 58% of amine added. |
| 6 | 101 | 71% of amine added; amine addition stopped; 1-chlorodecane addition started. |
| 12 | 133 | 38% of chloride added. |
| 16 | 143 | 80% of chloride added; chloride addition stopped. |
| 56 | 156 | Chloride addition resumed. |
| 63 | 146 | Chloride addition completed; amine addition resumed. |
| 69 | 141 | Amine addition completed. |

Upon completion of the amine addition, the mass was heated for approximately five hours, with the temperature gradually increasing to 165° C. The reaction mass was then cooled and approximately 100 parts of water and 16 parts of hydrochloric acid were added thereto with agitation. The mass separated into two liquid layers; the organic layer was withdrawn and washed successively with water, aqueous sodium carbonate and water. The washed product was steam sparged under vacuum and dried. The yield of dodecyl caprate, based on the amount of capric acid charged, was 81.6%.

*Example 13*

To the reaction vessel was charged approximately 36.6 parts of adipic acid. Thereafter, with agitation and while heating, about 52.7 parts of triethylamine and 91.8 parts of 1-chlorodecane were added as follows:

| Time (Minutes) | Temperature, ° C. | Remarks |
| --- | --- | --- |
| 0 | Room | Triethylamine addition begun. |
| 3 | Room | 13% of amine added. |
| 6 | 52 | 24% of amine added; amine addition stopped. |
| 15 | 106 | 1-chlorodecane addition begun. |
| 17 | 98 | 18% of chloride added, two phases forming. |
| 20 | 98 | Chloride addition completed; amine addition resumed. |
| 24 | 125 | 34% of amine added. |
| 28 | 127 | 50% of amine added; amine addition stopped; still two phases present. |
| 79 | 136 | Amine addition resumed. |
| 84 | 125 | 80% of amine added; amine addition stopped. |
| 139 | 125 | Amine addition resumed. |
| 144 | 122 | Amine addition completed. |

Upon completion of the amine addition, the mass was heated at about 130° C. for about four hours, then cooled and approximately 90 parts of water and 11 parts of hydrochloric acid were added thereto. The mass separated into two layers; the organic layer was withdrawn and washed successively with water, aqueous sodium carbonate and water, then steam sparged under vacuum and dried. The yield of di-n-decyl adipate was 83% based on adipic acid consumed.

*Example 14*

In the manner of Example 3, 50.0 parts of succinic anhydride, 9.0 parts of water, 110 parts of triethylamine, and 320 parts of octadecyl chloride were utilized to prepare dioctadecyl succinate in an excellent yield based on succinic anhydride.

*Example 15*

In the manner of Example 12, 80.2 parts of lauric acid, 81.5 parts of tributylamine, and 56.6 parts of n-propyl bromide were utilized to prepare n-propyl laurate in an excellent yield based upon lauric acid.

*Example 16*

In the manner of Example 12, 114.0 parts of stearic acid, 44.6 parts of triethylamine, and 68.5 parts of 2-ethylhexyl chloride were utilized to prepare 2-ethylhexyl stearate in excellent yield based upon stearic acid.

*Example 17*

In the manner of Example 3, 34.4 parts of maleic anhydride, 6.6 parts of water, 75.0 parts of triethylamine, and 141.1 parts of n-decyl chloride were utilized to prepare di-n-decyl maleate. The yield of di-n-decyl maleate, based upon maleic anhydride, was 73.6%.

*Example 18*

To the reaction vessel was charged 111 parts of butyl acid phthalate and a mixture of 58.2 parts of triethylamine and 102 parts of a chloroalkane having a boiling range of 85–128° C. at 24 mm. Hg absolute (prepared by the chlorination of an n-alkane petroleum fraction boiling between 145–178° C. at atmospheric pressure and containing n-alkanes of 9 and 10 carbon atoms), the chlorination being carried to a point where the gain in weight of the alkane mixture corresponded to the monochlorination level. The mixture was heated for about 30 hours while gradually increasing the temperature from 120° C. to 170° C. After refining in the manner of Example 1, there was obtained 168 parts of a mixture of alkyl butyl phthalates (about an 87% yield).

*Example 19*

To the reaction vessel was charged 59.4 parts of phthalic anhydride, 30.4 parts of n-butyl alcohol, 49.0 parts of triethylamine and 270.6 parts of chlorinated alkane, containing alkanes having from 8 to 17 carbon atoms, of an average molecular weight of 183.5 (which alkane fraction contained about 35 mol percent chlorine). The mixture was heated at temperatures of about 120° C. to 160° C. over a period of about 27 hours. After refining in the manner similar to Example 1, there was obtained about 99 parts of alkyl butyl phthalates.

The chloroalkane reactants which can be employed in the process of this invention may be charged as a substantially pure individual chloroalkane or may be charged as a mixture of chloroalkanes having an average weight corresponding to the weight of a particular chloroalkane, as shown in some of the foregoing examples. Chloroalkanes of the desired characteristics may be obtained from any suitable source, but are most conveniently derived from the chlorination of alkane petroleum fractions.

In addition to providing a new and novel esterification process for acids and acid anhydrides as discussed above, there is now provided, by the method of our invention, a process whereby hydroxy aliphatic acids can be esterified in high yield and without the formation of undesirable by-products. This aspect of our invention is, in and of itself, a considerable advance in the art due to the nature of hydroxy aliphatic acids. The dual function of these acids is very marked, for the hydroxyl and carboxyl groups show the usual properties of alcohols and acids. Thus, such acids form salts, esters and amides in the carboxyl group and undergo acetylation of the hydroxyl group in the usual manner. With certain reactants, such as phosphorus trichloride, both functional groups enter into the reaction. In some reactions, the behavior of such acids depends upon the location of the hydroxyl group. In attempting to esterify hydroxy aliphatic acids, the problem of undesired side reactions is encountered due to this dual functionality. Thus, merely upon heating, the alpha-hydroxy acids yield lactides, the beta-hydroxy acids form unsaturated acids, the gamma-hydroxy and delta-hydroxy acids form lactones, and the epsilon-hydroxy acids (or others where the hydroxyl group is more remote from the carboxyl group) form unsaturated acids. Also, the formation of polyesters is quite possible, since many molecules of a hydroxy aliphatic acid can undergo mutual esterification.

By the method of our invention, however, the various undesired side reactions mentioned above are substantially eliminated and hydroxy aliphatic acids can be esterified with alkyl halides to give high yields of desired esters. Thus, by the method of our invention, mono-hydroxy aliphatic acids, such as glycolic acid, lactic acid, beta-hydroxypropionic acid, hydroxybutyric acid, hydroxyvaleric acid, hydroxycaproic acid, malic acid and citric acid, as well as the dihydroxy aliphatic acids, such as tartaric acid, can now be readily esterified. Also, substituted hydroxy aliphatic acids, such as methylmercapto-alpha-hydroxybutyric acid and ethylmercapto-alpha-hydroxybutyric acid, can be esterified with affecting the various substituents previously added to a hydroxy aliphatic acid.

*Example 20*

Into a suitable reaction vessel there were charged about 16 parts of 4-ethylmercapto-alpha-hydroxybutyric acid and about 12.4 parts of triethylamine which were stirred until a homogeneous liquid was formed. After charging about 19 parts of n-propyl bromide, the vessel contents were heated to about 110° C. for about four hours. The reaction mixture was then allowed to cool to room temperature. Upon cooling, a slurry formed which was taken up in water and extracted with ether. The combined ether extracts, a light-brown oil, were washed with dilute hydrochloric acid, then with water, and then with aqueous sodium carbonate. After completing the washing, the crude n-propyl-4-ethylmercapto-alpha-hydroxy butyrate was distilled over a period of about 70 minutes with a maximum temperature of about 150° C. and a pressure of about 0.26 mm. of mercury absolute. The distilled product, a high yield of n-propyl-4-ethylmercapto-alpha-hydroxy butyrate, was a clear liquid having a faint yellow color and was soluble in acetone, ether, ethanol, benzene, carbon tetrachloride, ethyl acetate and heptane, but was insoluble in water.

In a similar manner, other hydroxy aliphatic acids can be reacted with alkyl halides to give high yields of essentially pure alkyl esters of hydroxy aliphatic acids.

Many of the esters prepared by the method of our invention are suitable for use as plasticizers for polyvinyl chloride resins. The term "polyvinyl chloride resins" includes polyvinyl chloride and copolymers of vinyl chloride. Examples of such polyvinyl chloride resins are illustrated by polyvinyl chloride and copolymers of polyvinyl chloride with vinyl acetate, methyl methacrylate, diethyl maleate, dibutyl maleate or vinylidene chloride, particularly those copolymers containing at least 85% of combined vinyl chloride. Examples of esters which can be prepared from alkyl halides by our invention, which are suitable for use as plasticizers for polyvinyl chloride resins, are the phthalates and adipates, specific examples of which are di-n-butyl phthalate, di-n-octyl phthalate, di-n-decyl phthalate, n-butyl n-octyl phthalate, n-butyl n-decyl phthalate, n-butyl n-dodecyl phthalate, n-butyl tridecyl phthalate, n-butyl 2-ethylhexyl phthalate, di-2-ethylhexyl adipate, di-n-octyl adipate, di-n-hexyl adipate, as well as phthalates and adipates prepared by utilizing a halogenated alkane petroleum fraction. Where employing these esters as a plasticizer for polyvinyl chloride resins, they can be used at a concentration of from about 20 parts by weight to about 300 parts by weight per 100 parts by weight of polyvinyl chloride resin.

Non-limiting examples of polyvinyl chloride resins plasticized with some of the compounds prepared by the method of our invention are given below. In all cases, the test sheet was a 40-mil sheet of polyvinyl chloride with a 40% plasticizer concentration. Parts are in parts by weight.

*Example 21* n-Butyl acid phthalate was reacted by the method of our invention with chlorinated decane (decane chlorinated to about 35 mol percent chlorine) to produce a mixture of n-butyl decyl phthalates. Approximately 100 parts of polyvinyl chloride were worked with approximately 66 parts of the above-n-butyl decyl phthalates on a differential speed roll mill, having one roll at a higher temperature than the other roll, until a homogeneous plasticized composition was formed. To a 40-mil sheet of this plasticized composition, evaluation tests were run in accordance with the directions contained in the references hereinafter set forth, and the following results were observed:

| Low Temperature Flexibility Point, ° C. | Volatility, Percent Loss |
|---|---|
| −37.9 | 15.2 |

*Example 22*

Approximately 100 parts of polyvinyl chloride were worked with approximately 66 parts of butyl $C_8$–$C_{17}$ phthalates prepared in Example 19 to prepare a plasticized polyvinyl chloride composition. Evaluation tests on a 40-mil sheet of said composition were run in accordance with the directions contained in the references hereinafter set forth, and the following results were observed:

| Low Temperature Flexibility Point, ° C. | Volatility, Percent Loss |
|---|---|
| −40.3 | 8.5 |

Example 23 n-Butyl acid phthalate was reacted by the method of our invention with a chlorinated kerosene (kerosene chlorinated to about 36 mol percent chlorine, which kerosene originally had a distillation range of 217–238° C. and an aniline cloud point of 194.5° C.) to produce a mixture of n-butyl keryl phthalates. Approximately 100 parts of polyvinyl chloride and approximately 66 parts of the above n-butyl keryl phthalates were utilized to prepare a homogeneous plasticized composition. To a 40-mil sheet of said plasticized composition, evaluation tests were run in accordance with the directions contained in the references hereinafter set forth, and the following results were observed:

| Low Temperature Flexibility Point, ° C. | Volatility, Percent Loss |
|---|---|
| −25.2 | 4.9 |

Example 24

A plasticized polyvinyl chloride composition was prepared as in Example 21, using approximately 100 parts of polyvinyl chloride and approximately 66 parts of the di-n-octyl phthalate prepared in Example 3. Evaluation tests on a 40-mil sheet were run in accordance with the directions contained in the references hereinafter set forth, and the following results were observed:

| Low Temperature Flexibility Point, ° C. | Volatility Percent Loss |
|---|---|
| −48.2 | 2.2 |

Example 25

A plasticized polyvinyl chloride composition was prepared as in Example 21, using approximately 100 parts of polyvinyl chloride and approximately 66 parts of the di-n-decyl phthalate prepared in Example 5. Evaluation tests on a 40-mil sheet were run in accordance with the directions contained in the references hereinafter set forth, and the following results were observed:

| Low Temperature Flexibility Point, ° C. | Volatility, Percent Loss |
|---|---|
| −51.2 | 1.8 |

Example 26

A plasticized polyvinyl chloride composition was prepared as in Example 21, using approximately 100 parts of polyvinyl chloride and approximately 66 parts of di-2-ethylhexyl adipate. Evaluation tests on a 40-mil sheet were run in accordance with the directions contained in the references hereinafter set forth, and the following results were observed:

| Low Temperature Flexibility Point, ° C. | Volatility, Percent Loss |
|---|---|
| −65 | 13 |

The methods used to determine the properties shown in Examples 21 to 26 were as follows:

| Property | Method |
|---|---|
| Low Temperature Flexibility | Clash and Berg Ind. and Engr. Chem., Vol. 34, p. 1218. |
| Volatility | ASTM D1203–52T. |

Also, other esters which can be produced by the method of our invention find various uses; for example, stearates, such as 2-ethylhexyl stearate, which are useful in grease compositions, and the maleates, such as di-n-decyl maleate, which are useful as a copolymer with polyvinyl acetate to make a latex-type resin for paints.

Replacing triethylamine or tri-n-butylamine in the foregoing examples with an equimolar amount of such tertiary amines as triethanolamine, trimethylamine, dimethylethylamine, tri-n-propylamine, triisobutylamine, dimethylcyclohexylamine, dimethylbenzylamine, and the like, substantially the same results are obtained. In the process of this invention, the tertiary amine is recovered in substantially quantitative amounts upon neutralizing the tertiary amine hydrohalide by-product which is obtained from the reaction mass in the form of an aqueous solution thereof, e.g., the water washes.

Also, in the case of polycarboxylic acid, acid esters may be further esterified and therefore utilized in the method of this invention. Furthermore, a mixture of polycarboxylic acid and an alcohol can be charged and the mixture heated in the presence of the tertiary amine and simultaneously or thereafter in the presence of the alkyl halide reactant. In the appended claims, therefore, it is to be understood that the acid reactant may be either the acid per se, or an acid ester of an organic polycarboxylic acid, or acid or acid ester and a sufficient amount of an alcohol to form an ester. Thus, the invention is applicable to any organic compound containing at least one COOH group.

It is to be understood that the above description is given by way of illustration only, and that deviations are possible without departing from the spirit or scope of the invention.

This case is a continuation-in-part of our copending application, Serial No. 701,312, filed December 12, 1957 and now abandoned.

What is claimed is:

1. In a method for the preparation of an ester of an organic carboxylic acid the step comprising reacting one mol proportion of alkyl halide containing from 1 to 20 carbon atoms, the halogen of said halide being selected from the group consisting of chlorine, bromine and iodine, and one mol proportion of a saturated tertiary aliphatic amine containing 3 to 24 carbon atoms and having the structure $$R_2-\underset{\underset{R_3}{|}}{\overset{\overset{R_1}{|}}{N}}-R_3$$

wherein $R_1$, $R_2$ and $R_3$ are aliphatic radicals, with each equivalent of organic carboxylic acid to be esterified.

2. A method of claim 1 wherein the alkyl halide is an alkyl chloride and the tertiary aliphatic amine is a trialkylamine.

3. A method of claim 2 wherein the trialkylamine is triethylamine.

4. In a method for the preparation of an ester of an organic carboxylic acid, the step comprising reacting one mol proportion of alkyl halide containing from 4 to 20 carbon atoms, the halogen of said halide being selected from the group consisting of chlorine, bromine and iodine, and one mol proportion of a saturated tertiary aliphatic amine containing 3 to 24 carbon atoms and having the structure $$R_2-\underset{\underset{R_3}{|}}{\overset{\overset{R_1}{|}}{N}}-R_3$$

wherein $R_1$, $R_2$ and $R_3$ are aliphatic radicals, with each equivalent of organic carboxylic acid to be esterified.

5. In a method for the preparation of an ester of an organic carboxylic acid, the step comprising reacting one mol proportion of alkyl chloride containing from 4 to 20 carbon atoms and one mol proportion of trialkylamine containing a total of 3 to 24 carbon atoms with each equivalent of organic carboxylic acid to be esterified.

6. A method of claim 5 wherein the trialkylamine is triethylamine.

7. A method of claim 5 wherein the alkyl chloride is that obtained by mono-chlorinating a petroleum fraction containing alkanes boiling at atmospheric pressure within the range of about 30° C. to about 300° C.

8. A method of claim 5 wherein the alkyl chloride is that obtained by mono-chlorinating an alkane petroleum fraction containing alkanes having from 8 to 17 carbon atoms.

9. In a method for the preparation of an ester of a phthalic acid, the step comprising reacting one mol proportion of alkyl halide containing from 1 to 20 carbon atoms, the halogen of said halide being selected from the group consisting of chlorine, bromine and iodine, and one mol proportion of a saturated tertiary aliphatic amine containing 3 to 24 carbon atoms and having the structure

wherein $R_1$, $R_2$ and $R_3$ are aliphatic radicals, with each equivalent of said acid to be esterified.

10. A method of claim 9 wherein the alkyl halide is an alkyl chloride.

11. A method of claim 10 wherein the alkyl chloride contains from 4 to 20 carbon atoms.

12. A method of claim 11 wherein the reaction is carried out at a temperature in the range of about 100° C. to about 200° C.

13. A method of claim 11 wherein the phthalic acid is ortho-phthalic acid.

14. A method of claim 10 wherein the tertiary aliphatic amine is triethylamine.

15. In a method for the preparation of alkyl n-butyl phthalates the steps comprising reacting one mol of n-butyl acid phthalate, one mol proportion of alkyl chloride containing 4 to 20 carbon atoms and one mol proportion of a saturated tertiary aliphatic amine of the structure

wherein $R_1$, $R_2$ and $R_3$ are each aliphatic radicals containing a total of from 3 to 24 carbon atoms.

16. A method of claim 15 wherein the tertiary aliphatic amine is triethylamine.

17. A method of claim 5 wherein the organic carboxylic acid is butyl acid phthalate and the alkyl chloride is that obtained by mono-chlorinating an alkane petroleum fraction containing alkanes boiling at atmospheric pressure within the range of from about 150° C. to about 235° C.

18. A method of claim 5 wherein the organic carboxylic acid is butyl acid phthalate and the alkyl chloride is that obtained by chlorinating the alkanes of a kerosene petroleum fraction.

19. A method of claim 5 wherein the organic carboxylic acid is a hydroxy-substituted carboxylic acid.

20. A method of claim 19 wherein the hydroxy-substituted carboxylic acid is 4-methylmercapto-alpha-hydroxybutyric acid.

21. A method of claim 19 wherein the hydroxy-substituted carboxylic acid is 4-ethylmercapto-alpha-hydroxybutyric acid.

22. In a method for the production of alkyl esters of organic dicarboxylic acids, the step comprising reacting two mol proportions of alkyl chloride containing from 4 to 20 carbon atoms, two mol proportions of a triethylamine, one mol proportion of water, and one mol proportion of dicarboxylic acid anhydride.

23. A method of claim 22 wherein the dicarboxylic acid anhydride is maleic anhydride.

24. A method of claim 22 wherein the dicarboxylic acid anhydride is succinic anhydride.

25. In a method for the preparation of dialkyl phthalate esters, the step comprising reacting two mol proportions of alkyl chloride containing from 4 to 20 carbon atoms, two mol proportions of trialkylamine containing a total of 3 to 24 carbon atoms, one mol proportion of water, and one mol proportion of phthalic anhydride.

26. In a method for the preparation of dioctyl o-phthalate the steps comprising reacting two mol proportions of octyl chloride, two mol proportions of triethylamine, one mol proportion of water and one mol proportion of phthalic anhydride.

27. In a method for the preparation of didecyl o-phthalate the steps comprising reacting two mol proportions of decyl chloride, two mol proportions of triethylamine, one mol proportion of water and one mol proportion of phthalic anhydride.

28. A method of claim 25 wherein the trialkyl amine is triethylamine.

29. A method of claim 25 wherein the alkyl chloride is that obtained by chlorinating to the mono-chlorination level an alkane petroleum fraction containing alkanes boiling at atmospheric pressure within the range of from about 150° C. to about 235° C.

30. A method of claim 25 wherein the alkyl chloride is chloro-octane.

31. A method of claim 25 wherein the alkyl chloride is chloro-decane.

References Cited in the file of this patent

UNITED STATES PATENTS

| | | |
|---|---|---|
| 1,691,425 | Ayres et al. | Nov. 13, 1928 |
| 1,869,837 | Ayres et al. | Aug. 21, 1932 |
| 2,841,610 | Lott | July 1, 1958 |

FOREIGN PATENTS

| | | |
|---|---|---|
| 371,046 | Germany | Apr. 10, 1921 |

OTHER REFERENCES

Buttrey: Plasticizers, Cleaver-Hume Press Ltd., London, 1950, page 9.

Groggins: Unit Processes in Organic Synthesis," pp. 624–5, McGraw-Hill, 1952.

Wagner et al.: Synthetic Organic Chemistry, John Wiley & Sons, New York, 1953, page 484.

Modern Plastics Encyclopedia Issue, September 1957, p. 608, Breskin Publ., Bristol, Conn.

Peterson et al.: Ind. Eng. Chem., 49, 1485–90 (1957).

Wagner et al.: Op. Cit., p. 418.

UNITED STATES PATENT OFFICE
CERTIFICATE OF CORRECTION

Patent No. 3,148,207                      September 8, 1964

Oliver J. Weinkauff et al.

It is hereby certified that error appears in the above numbered patent requiring correction and that the said Letters Patent should read as corrected below.

Column 4, in the table, under the heading "Temperature, ° C." and opposite "24" for "151" read -- 141 --; column 13, line 44, for "steps" read -- step --; column 14, under the heading "OTHER REFERENCES" add the following:

Moreland, Jr.-J. Org. Chem., 21, 820-1 (1956).

Signed and sealed this 9th day of February 1965.

(SEAL)
Attest:

ERNEST W. SWIDER                      EDWARD J. BRENNER
Attesting Officer                      Commissioner of Patents